United States Patent [19]

Renshaw

[11] Patent Number: 4,962,507

[45] Date of Patent: Oct. 9, 1990

[54] FEED FORWARD SPREAD SPECTRUM SIGNAL PROCESSOR

[75] Inventor: Kenneth H. Renshaw, Manhattan Beach, Calif.

[73] Assignee: Hughes Aircraft Company, Los Angeles, Calif.

[21] Appl. No.: 415,165

[22] Filed: Sep. 29, 1989

[51] Int. Cl.⁵ .............................................. H04K 1/00
[52] U.S. Cl. ....................................................... 375/1
[58] Field of Search ...................... 375/1; 342/352, 357

[56] References Cited

U.S. PATENT DOCUMENTS 4,630,283  12/1986  Schiff ...................................... 375/1

Primary Examiner—Salvatore Cangialosi
Attorney, Agent, or Firm—Robert A. Westerlund; Steven M. Mitchell; Wanda Denson-Low

[57] ABSTRACT

A communications receiver for a code division multiple access (CDMA) satellite communication system in which a plurality of data carriers share the same band. A pilot carrier transmits a timing reference used by all receivers to acquire the clock used in timing the code generators, and used as a frequency and phase reference for data detection. This receiver employs a digital signal processor that detects a spread pilot carrier and uses the phase noise on the pilot carrier to subtract the communication link phase noise from the data carriers, thus allowing communication at lower signal-to-noise ratios.

12 Claims, 2 Drawing Sheets

FEED FORWARD SPREAD SPECTRUM SIGNAL PROCESSOR

BACKGROUND

The present invention relates to spread spectrum receivers and, more particularly, to a spread spectrum communication feed forward signal processor that uses a pilot carrier and a data carrier to reduce the effects of phase noise introduced by the transmission system.

Phase noise is a serious problem in commerical mobile satellite systems. Voice or data signals come from a telephone system into a fixed satellite terminal where they spread spectrum modulated onto a carrier and transmitted at Ku band to a satellite. The upconverter in this fixed station adds phase noise. The satellite receives the Ku band signal and translates it to L band. The translation is on the order of 10 GHz. In the vicinity of the mobile terminal the signal is scattered from trees and buildings, and the like, to add more phase noise due to mulitpath propagation. The mobile terminal receives the signal and translates it to baseband. All of these translations and the multipath propagation add phase noise. The total phase noise limits the system performance.

The phase noise problem is particularly severe where large frequency translations are used. In the above example, a 10 GHz carrier must be synthesized on the satellite to make the translation. This carrier is derived from a relatively low frequency crystal source (5 MHz). In the process of multiplying the frequency of the source, the phase noise of the source is also multiplied. The baseband to Ku band up-converter in the fixed uplink station also adds phase noise. However, higher purity sources are available for terrestrial application and the phase noise added to the link by the ground terminal is less than the phase noise added to the link by the satellite.

One problem with conventional spread spectrum communication receivers is that the phase noise of the pilot is added to the phase noise of the data signal, thereby degrading the performance.

In view of the disadvantages of conventional spread spectrum communication receivers, it was contemplated that a new and novel solution to the phase noise problem would process the signals in such a manner that the phase noise of the pilot would be substracted from the phase noise of the data signal, thus improving the performance. It was also contemplated that a novel solution to the phase noise problem would allow communication at lower signal-to-noise ratios on spread spectrum communication links corrupted by phase noise.

SUMMARY OF THE INVENTION

In accordance with these and other features of the invention, there is provided a feed forward circuit for a spread spectrum signal radio receiver that detects a spread spectrum pilot carrier and uses the phase noise on that carrier to remove the link phase noise from the data carriers. The pilot carrier and the data carrier are contaminated with phase noise identically in the transmission system. In the receiver frequency translation process the recovered pilot is used to translate the data signal in a manner that allows the phase noise to be subtracted.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which.

DETAILED DESCRIPTION

Figure 1:
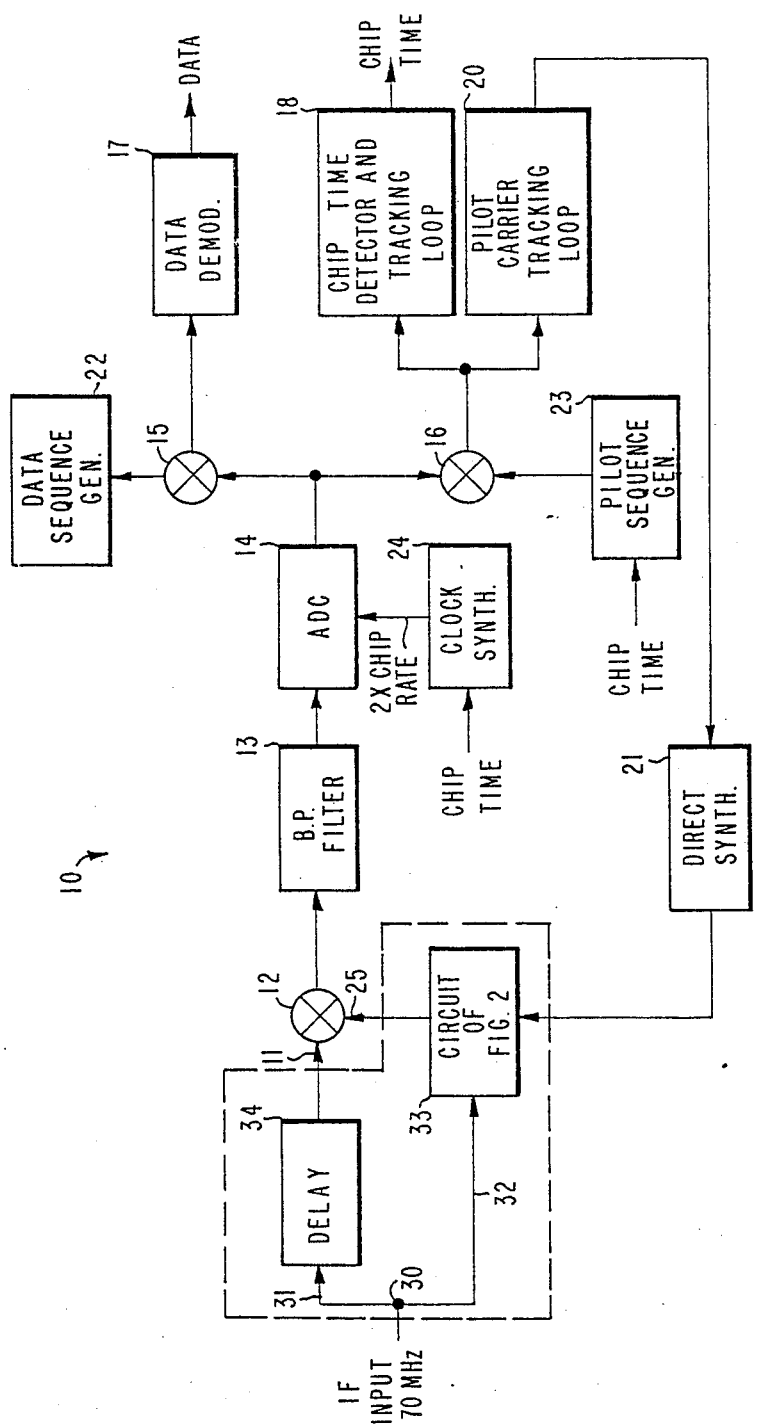
FIG. 1 is a block diagram of a portion of a radio receiver for spread spectrum signals incorporating the feed forward circuit in accordance with the present invention.

Referring now to FIG. 1 of the drawings, there is shown a schematic diagram of a portion of a spread spectrum receiver 10 for use in a code division multiple access (CDMA) satellite communications system. In a CDMA satellite communications system there are a plurality of data carriers sharing the same band. Some systems use a common spread spectrum modulated pilot carrier that is 10 dB or so stronger than the data carriers to transit a timing reference. That same timing reference is used by all receivers in the system to acquire the clock used in timing code generators. The receivers also use the pilot carrier as frequency and phase reference for the data detection.

FIG. 1 shows the signal processor portion of a receiver 10 for use in a mobile communications system. In that system, the spread spectrum modulated pilot carrier, modulated at the data symbol rate, is used to communicate timing from a hub station to the mobile units. The mobile units acquire the pilot carrier and code timing and then use that timing as the reference for acquiring the spread spectrum code on the data channel. In that system the pilot carrier and the data carriers are the same frequency.

The signal processor portion of the receiver 10 comprises a first mixer 12 with its output connected by way of a first bandpass filter 13 to the input of a first analog to digital converter (ADC) 14. The output of the first analog to digital converter 14 is connected to the inputs of second and third mixers 15, 16. The output of the second mixer 15 is coupled to a data demodulator 17, whereas the output of the third mixer 16 is coupled to the inputs of a chip time detector and tracking loop 18 and a first pilot carrier tracking loop 20. The output of the first pilot carrier tracking loop 20 goes to a direct synthesizer 21. The second mixer 15 is connected to a reference provided by a data sequence generator 22. The third mixer 16 is connected to a reference provided by a pilot sequence generator 23. The first analog to digital converter 14 is connected to a reference provided by a clock synthesizer 24. The chip time detector and tracking loop 18 provides a chip time reference which is applied to the pilot sequence generator 23 and to the clock synthesizer 24.

In operation, the signal applied to the input of the signal processor portion of the receiver 10 appears at an input terminal 11 of the first mixer 12. The input signal is an intermediate frequency (IF) signal at an IF frequency of 70 MHz (66–74 MHz) in the present example. The IF signal is a spread spectrum signal of the type referred to above, with a chip rate of eight megacycles per second. The IF signal includes a 4 MHz pilot carrier which is used to synthesize a 22 MHz reference signal that is applied to a reference input 25 of the first mixer 12. It will be understood that these frequencies and parameters are merely illustrative, by way of example, and that the invention is not limited to this particular set of parameters.

Accordingly, the first mixer 12 mixes the 70 MHz IF signal with the 22 MHz reference signal to translate the signal to a 44-52 MHz band. After filtering at 44-52 MHz in the first bandpass filter 13, the signal is sampled in the first analog to digital converter 14 at a rate of two times the chip rate (16 MHz). The sampled version of the spread signal is separated into three branches, two going to pilot carrier processing and one going to data demodulator 17. The pilot carrier is multiplied by the pilot code sequence in the third mixer 16 to collapse the frequency to a 4 MHz carrier. The chip time detector and tracking loop 18 recovers the chip time. The pilot code timing is the same as the data timing and is used as the timing reference for the code sequence used to despread the data.

Heretofore, the 4 MHz carrier reference contaminated by the phase noise was coupled from the pilot carrier tracking loop 20 to the direct synthesizer 21. The 4 Mhz carrier reference was multiplied by 22/4 or 5.5 in the direct synthesizer 21. This produced a 22 MHz signal having multiplied phase noise. Heretofore that signal was then applied directly to reference input terminal 25 of the first mixer 12. Thus, the phase noise of the pilot was added to the phase noise of the data signal, thereby degrading the performance. In the IF translation process that occurs in the first mixer 12, the 22 MHz reference was adding phase noise to the signal.

In accordance with the principles of the present invention, the incoming 70 MHz IF signal is divided into two paths 31, 32 at a junction 30. In the lower path 32 of FIG. 1, the signal is applied to an added circuit 33 shown in FIG. 2. The second or upper path 31 of the input IF signal goes to a delay element 34. The delay element 34 delays the composite signal to compensate for the phase delay in the lower path 32 through the added circuit 33. The output of the delay element 34 is applied to the input terminal 11 of the first mixer 12 and the output of the added circuit 33 connects to the reference input 25 of the first mixer 12.

Figure 2:
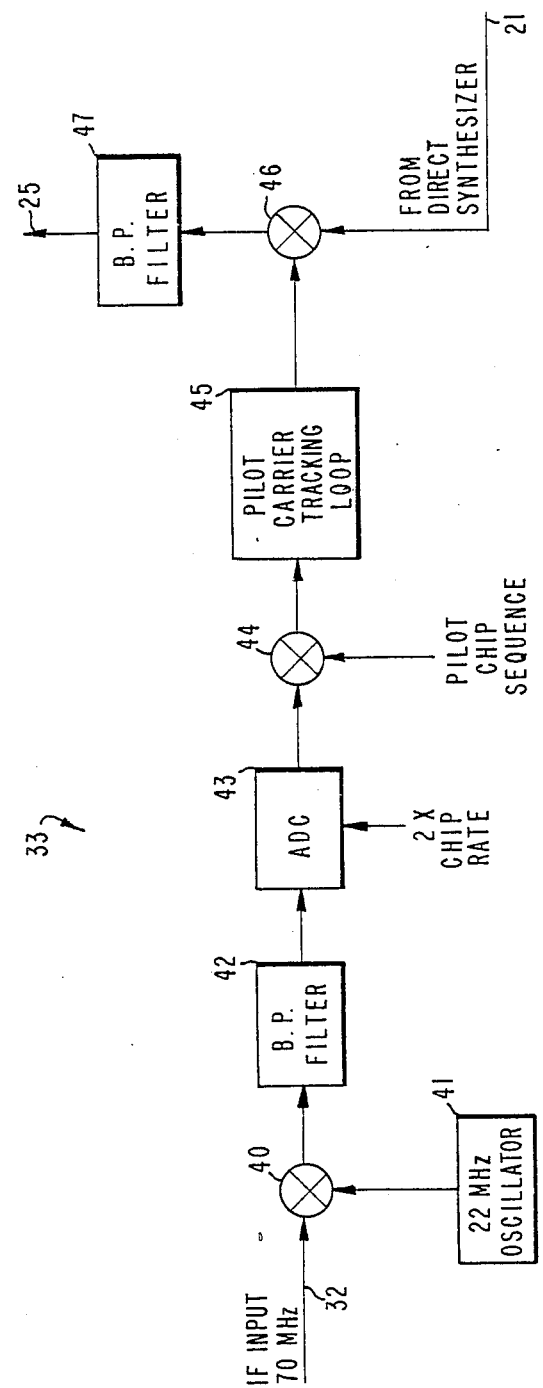
FIG. 2 is a block diagram of the circuit added to the receiver of FIG. 1 for providing phase noise cancellation in accordance with the principles of the present invention.

Referring now to FIG. 2 taken in conjunction with FIG. 1, there is provided a fourth mixer 40 to which is applied the 70 MHz IF input signal from the lower path 32. A 22 MHz oscillator 41 applies a reference signal to the reference input of the fourth mixer 40. The output of the fourth mixer 40 is applied to a second bandpass filter 42 which passes 44-52 MHz. The output of the second bandpass filter 42 is applied to a second analog to digital converter 43. The reference to the second analog to digital converter 43 is the output of the clock synthesizer 24 at two times chip rate or 16 MHz. The output of the second analog to digital converter 43 is applied to a fifth mixer 44. The reference for the fifth mixer 44 is the pilot chip sequence from the pilot sequence generator 23. The output of the fifth mixer 44 is applied to a second pilot carrier tracking loop 45. The output of the second pilot carrier tracking loop 45 is connected to a sixth mixer 46. The reference for the sixth mixer 46 is the output of the direct synthesizer 21. The output of the sixth mixer 46 is coupled through a third bandpass filter 47 which passes 22 MHz to the reference input 25 of the first mixer 12.

The operation is as follows. In the lower path 32 the signal is mixed in the fourth mixer 40 with a 22 MHz local oscillator signal developed by the 22 MHz oscillator 41. The heterodyned output signal from the fourth mixer 40 is applied to the second bandpass filter 42 which passes only signals in the band of 44-52 MHz. The filtered signals are applied to the second analog to digital converter 43 where they are separated into their in-phase and quadrature components and then sampled and digitized. The sampling rate is equal to two times the envelope bandwidth of 16 MHz. In the fifth mixer 44, the sampled composite signal is multiplied times the pilot chip-sequence signal. The collapsed spread spectrum signal appears at the output of the fifth mixer 44 in a CW form. The second pilot carrier tracking loop 45 filters the signal. The bandwidth of the second pilot carrier tracking loop 45 is sufficient to pass the large components of phase noise. The output of the pilot carrier tracking loop 45 is a 4 MHz carrier (in this example) which is contaminated by phase noise.

In the sixth mixer 46 the output of the second pilot carrier tracking loop 45 is mixed with a local 18 MHz source synthesized in the direct synthesizer 21 from the "clean" pilot carrier from the first pilot carrier tracking loop 20. The sum frequencies from the sixth mixer 46 are filtered by the third bandpass filter 47 at 22 MHz. The bandwidth of this filter 47 is sufficient to pass the large components of phase noise.

The second or upper path 31 of the input IF signal from the junction 30 goes to the delay element 34. The delay element 34 delays the composite signal to compensate for the phase delay in the lower path 32 from the fourth mixer 40 to the third bandpass filter 47. At the first mixer 12 the reference 22 MHz signal form the third bandpass filter 47 is mixed with the composite received IF input signal. In the first mixer 12 the sum and difference frequency and phase components are generated. Because the phase noise on the 22 MHz signal from the third bandpass filter 47 and the composite IF input signal are identical, the difference frequency components passed through the first bandpass filter 13 will not have the radio link phase noise.

In the first analog to digital converter 14 the signals are separated into their in-phase and quadrature components and then digitized at a sampling rate equal to two times the envelope bandwidth. In the third mixer 16 the sampled composite signal is multiplied times the pilot chip-sequence generated by the pilot-chip sequence generator 23 which operates from the chip-time detected in the pilot chip-time detector and tracking loop 18. At the output of the third mixer 16 the collapsed spread spectrum signal is present in a CW form. The first pilot carrier tracking loop 20 filters the signal. The output is a 4 MHz carrier (in this example) which is not contaminated by the radio link phase noise. In the second mixer 15 the composite signal with the phase noise removed is multiplied by the spread spectrum sequence from the data sequence generator 22. The data demodulator 17 demodulates the digital voice or data signals.

It is to be understood that the above-described embodiment, including the frequencies and parameters given by way of example, is merely illustrative of some of the many specific embodiment which represent applications of the principles of the present invention. Clearly, numerous and other arrangements ca be readily devised by those skilled in the art without departing from the scope of the invention.

What is claimed is:

1. A comunications receiver for receiving a code-division multiple access spread spectrum signal having a plurality of data carriers and a timing reference pilot carrier, said receiver comprising:
   detector means responsive to the spread spectrum signal for detecting the pilot carrier;
   means for determining the level of communication link phase noise present in the pilot carrier, said level of communication link phase noise being substantially identical to the level of phase noise present in the spread spectrum signal;
   means responsive to said determining means for generating a mixer input signal representative of said level of communication link phase noise; and
   mixer means responsive to the spread spectrum signal and responsive to said mixer input signal for subtracting said communication link phase noise from the date carriers.

2. The communications receiver of claim 1 wherein the detector means further comprises a pilot carrier tracking loop.

3. The communications receiver of claim 1 wherein the detector means further comprise a bandpass filter tuned to pass an intermediate frequency.

4. The communications receiver of claim 3 wherein the detector means further comprise an analog to digital converter.

5. The communications receiver of claim 1 wherein the detector means further comprise a data demodulator.

6. A feed forward spread spectrum signal processor comprising:
   means for combining a reference carrier contaminated by phase noise with a signal derived from a clean pilot carrier to produce a local oscillator signal; and
   a frequency translation circuit for subtracting the phase noise of the reference derived from the pilot from the nearly identical phase noise of the data carrier;
   whereby the feed forward spread spectrum signal processor provides communication at lower signal-to-noise ratios on spread spectrum radio links corrupted by phase noise.

7. In a spread spectrum communication system, a phase noise cancellation circuit comprising:
   means for driving a carrier reference signal contaminated by phase noise from a spread spectrum signal,
   means for deriving a carrier reference signal having no phase noise from said spread spectrum signal by combining a compensated heterodyne signal therewith,
   means for combining said carrier reference signal having no phase noise with a directly synthesized signal to produce a combined signal, and
   mixing means for mixing said carrier reference signal contaminated by phase noise with said combined signal for providing said compensated heterodyne signal to said means for deriving a carrier reference signal having no phase noise.

8. A communications receiver that removes phase noise from data carriers in a received spread spectrum radio signal, said receiver comprising:
   first signal processing means responsive to a radio transmission system for receiving a spread spectrum radio signal having data carriers and a pilot carrier and for extracting the pilot carrier from said spread spectrum radio signal, said data carriers and said pilot carrier being contaminated with substantially identical phase noise by the radio transmission system;
   a frequency synthesizer coupled to said first signal processing means for synthesizing a mixing signal from the extracted pilot carrier;
   second signal processing means responsive to said radio transmission system for extracting the pilot carrier from said spread spectrum radio signal;
   a mixer coupled to said frequency synthesizer and to said second signal processing means for mixing said signal with the pilot carrier from said second signal processing means to produce a sum frequency signal, and coupled to said first signal processing means for processing said sum frequency signal to recover the data carriers; and
   delay means coupled to the input of said first signal processing means for equalizing the time at which the spread spectrum radio signal is applied to said first and second signal processing means;
   whereby the phase noise on said sum frequency signal is subtracted and does not appear on the data carriers of the output of said first signal processing means.

9. The communications receiver of claim 8 in which said first signal processing means and said second signal processing means each includes a pilot carrier tracking loop.

10. The communications receiver of claim 8 in which said first signal processing means and said second signal processing means each includes a bandpass filter tuned to pass an intermediate frequency.

11. The communications receiver of claim 10 in which said first signal processing means and said second signal processing means each includes an analog to digital converter.

12. The communications receiver of claim 8 in which said first signal processing means includes a data demodulator.

* * * * *

UNITED STATES PATENT AND TRADEMARK OFFICE
CERTIFICATE OF CORRECTION

PATENT NO. : 4,962,507

DATED : October 9, 1990

INVENTOR(S) : Kenneth H. Renshaw

It is certified that error appears in the above-identified patent and that said Letters Patent is hereby corrected as shown below:

Column 6, Claim 8, line 28, please insert --mixing-- at the beginning of that line.

Signed and Sealed this

Seventeenth Day of March, 1992

Attest:

HARRY F. MANBECK, JR.

*Attesting Officer*  *Commissioner of Patents and Trademarks*